United States Patent [19]

Dupuis et al.

[11] Patent Number: 5,567,132
[45] Date of Patent: Oct. 22, 1996

[54] SEAL FOR PUMP HAVING AN INTERNAL GAS PUMP

[75] Inventors: Francis A. Dupuis, Lebanon; Ali M. Nasr, Summit, both of N.J.

[73] Assignee: Endura Pumps International, Inc., Garwood, N.J.

[21] Appl. No.: 349,940

[22] Filed: Dec. 6, 1994

[51] Int. Cl.⁶ ....................................... F04B 53/00
[52] U.S. Cl. .................. 417/420; 417/423.11; 277/96.1; 415/175
[58] Field of Search ...................... 417/373, 420, 417/423.7, 423.8, 423.11, 423.12; 277/96.1; 415/175

[56] References Cited

U.S. PATENT DOCUMENTS

| | | | |
|---|---|---|---|
| 4,047,847 | 9/1977 | Oikawa | 417/420 |
| 5,090,712 | 2/1992 | Pecht et al. | 277/96.1 |
| 5,199,172 | 4/1993 | Runowski | 277/96.1 |
| 5,288,213 | 2/1994 | Nasr | 417/420 |
| 5,308,229 | 5/1994 | DuPuis | 417/420 |

FOREIGN PATENT DOCUMENTS

499370 8/1992 European Pat. Off. ............. 277/96.1

Primary Examiner—Louis J. Casaregola
Assistant Examiner—Ronald G. McAndrews, Jr.
Attorney, Agent, or Firm—Bookstein & Kudirka, P.C.

[57] ABSTRACT

Pump apparatus having a wear end and a pump end is provided with a seal-pump for preventing liquid being pumped from entering the wear end. An internal pump is positioned between the wear end and the pump end of sealless pumps to direct small quantities of gas from the wear end to the pump end at a pressure which prevents liquid in the pump end to pass into the wear end. A seal is provided on a stationary ring of the internal pump which prevents fluid being pumped from contacting working portions of the internal pump.

19 Claims, 6 Drawing Sheets

SEAL FOR PUMP HAVING AN INTERNAL GAS PUMP

BACKGROUND OF THE INVENTION

This invention relates to a pumping apparatus having a wear end and a pump end having an internal pumping means to prevent fluid in the pump end from entering the wear end. More particularly, this invention relates to a sealless pumping apparatus having a pump end and a wear end wherein a rotor portion of the wear end is sealed from the environment around the wear end and wherein a barrier or separation is provided to prevent fluid in the pump end from entering the wear end.

Pumps generally include a pump end where incoming liquid is pressurized for subsequent recovery through an outlet and a wear end where the parts subject to wear such as bearings, shaft, thrust washers, driven magnet or the like are located. Pumps of all types, including centrifugal, gear or screw pumps rely on a seal or a magnetic drive or a canned motor design in order to minimize leakage from the pump. The relatively simple designs of the sealed pumps have a seal which will wear and, therefore eventually leak.

In canned motor design pumps and magnetic drive pumps, the rotor portion of the pump is separated and sealed from the stator portion of the pump or the drive magnet portion, respectively by means of a seal known as a can, lining or shell. The can prevents fluid in the rotor portion from contacting the environment. Since a rotating shaft does not rotate through the can, there is no need to provide a seal between the can and environment. The can portion of the pump is formed of a metallic or plastic composition to render it resistant to a variety of liquids being pumped, particularly hydrocarbon compositions and corrosive liquids. However, the type of liquids that can be pumped also is limited such as acidic compositions which degrade the can metallic composition, slurries, the solid portion of which rapidly deteriorate the wear end. In the case of slurries, it has been proposed to utilize a screen or a filter between the pump end and the wear end to eliminate contact between the solid portion of the slurry and the wear end. The use of filter screens is undesirable since they become rapidly plugged thereby depleting the wear end of needed heat exchange and lubricating liquid. In addition, in magnetic drive pumps, the use of metallic cans creates eddy current losses which consume energy and which produce undesirable heat that must be removed from the wear end. In addition, since presently available canned motor pumps and magnetic drive pumps rely upon the liquid being pumped to effect lubrication and heat removal in the wear end, they cannot be run dry accidently without destroying the pump. With either of the magnetic drive or canned motor sealless pump, the units do not have seals but they do have internal bearings and thrust washers and shafts which depend the fluid being pumped for lubrication. Accordingly, these parts will wear over time as well. In the event that the liquid being pumped is non-lubricating, abrasive or crystalline or very hot or cold, the bearings, washers and shafts can be damaged quickly and render the pumps either too expensive or impractical to repair.

U.S. Pat. No. 4,290,611 discloses a pumping seal utilizing a plate having a spiral grooves as a pump. U.S. Pat. No. 5,090,712 discloses a pumping seal having an alternative discontinuous grooved surface. U.S. Pat. No. 5,249,812 discloses a barrier seal system which utilizes dual dynamic seals, one of which is double balanced so that it will function in the event of pressure reversals.

U.S. Pat. Nos. 5,288,213 and 5,308,229 discloses canned motor design pumps and magnetic drive pumps which utilize a seal comprising a stationary ring and a rotating ring in contact with each other to effect fluid transfer from the wear end to the pump end while preventing primary fluid transfer from the pump end to the wear end.

While the class of seals which includes a rotating face in contact with a stationary face is generally satisfactory to control fluid flow across the seal formed by the two faces, a majority of the seals have an undesirably limited life. Failure is due primarily to solid particles entering the stationary portion of the seal during use and causing wear on portions of the seal such as springs used to bias the position of the stationary face against the rotating face. In addition, when utilizing a liquid in the wear end for lubrication, anti-friction bearings such as roller bearings or ball bearings cannot be used. Generally, sleeve bearings are used which are of higher cost and have less predictable life than anti-friction bearings.

Accordingly, it would be desirable to provide a durable long-life seal which is useful for transmitting fluid from a wear end to a pump end of a pump while preventing liquid being pumped from entering a wear end of a pump. This will allow the use of the pump in slurries, low viscosity or thin liquids, high temperatures, afford "run dry" protection and greatly extend the life of the wear end. It would also be desirable to provide a magnetic drive pump which can utilize a nonmetallic can in order to avoid eddy current loss. In addition, it would be desirable to avoid liquid in the wear end to permit use of anti-friction bearings and to provide more sensitive detection of unwanted liquid in the wear end but removes the negative aspects of the nonmetallic can being the only seal to the environment.

SUMMARY OF THE INVENTION

In accordance with this invention, a pump apparatus is provided having a pump end and a wear end wherein liquid in the pump end is prevented from entering the wear end by use of an internal pump positioned between the pump end and the wear end. Apparatus in the wear end includes a rotor means including a rotatable shaft and a stator wherein the rotor and stator are sealed from each other by a can structure. The pump end includes a pumping means such as an impeller mounted on the same rotatable shaft when rotating. The internal pump directs small quantities of pressurized gas from the wear end to the pump end while preventing the passage of liquid from the pump end into the wear end. When idle, the device prevents flow from the pump end into the wear end by forming a seal. The internal pump is constructed so that internal working components of the seal construction are sealed from contact with the liquid being pumped. Thus, the internal pump eliminates the problems associated with non-lubricating fluids, dry running mishaps, and the pumping of slurries with sealless pumps. In addition, it eliminates the corrosive or deteriorating affect of the liquid being pumped by the pump apparatus in the wear end. The pumps of this invention differ from prior art sealless pumps which do not include a sealing means or pump means between the wear end and the pump end. In addition, the pumps of this invention differ from prior art sealless pumps in that liquid is excluded from the wear end and from the internal working components of the seal construction.

BRIEF DESCRIPTION OF THE DRAWINGS

FIG. 5 FIG. 4 is a front view of a repeller taken along line 4—4 of FIG. 1A.

DESCRIPTION OF SPECIFIC EMBODIMENTS

The present invention provides a pump apparatus for preventing leakage from a sealless rotating pump. The sealless rotating pump is a canned motor pump or a magnetic drive pump. The pump apparatus of this invention comprises a pump end, a wear end and an internal pump positioned between the pump end and the wear end. The pump end includes a pumping means positioned on a rotatable shaft which effects an increase in liquid pressure in the pump end when the shaft is rotated. The pump means can be an impeller, a set of meshing gears used in a gear pump, screws, vanes, flexible impeller or the like. Conventional shaft supporting means on the wear end include bearings, thrust washers, magnetic bearings, anti-friction bearings, e.g., roller bearings or ball bearings, or the like. The wear end is supplied with a lubricating gas such as nitrogen, preferably air, which is passed through the wear end during use of the pump. An internal pump is positioned on the rotatable shaft between the pump end and the wear end and functions to pump small quantities of pressurized lubricating gas from the wear end to the pump end while preventing passage of liquid from the pump end to the wear end when rotating. It functions as a seal when idle. A stator portion of the wear end is separated from a rotor portion of the wear end by means of a seal commonly referred to in the art as a can or shell. Cooling passages can be provided through the stationary housing such as a dual can for the pump for heat exchange liquid such as water to remove heat generated.

A suitable pump comprises a stationary ring mounted on a stationary section of a housing for the pump. The stationary ring is positioned to surround the rotatable shaft. A rotatable ring having a face which provides pumping and sealing is mounted on the rotatable shaft between the pump end and the wear end. The rotating ring can be mounted directly on the shaft or indirectly on the shaft by being mounted on an impeller or on a second rotatable ring or the like which, in turn, is mounted on the shaft. The surface of the rotatable ring having the pattern contacts the face of the stationary ring. A pattern or inclined surface on either the rotatable ring or the stationary ring provides fluid communication between the wear end and the pump end when the rotatable shaft is rotated and is configured to increase the pressure of the lubricating gas in the wear end to effect passage of small quantities of gas from the wear end into the pump end. Since lubricating gas is pumped into the pump end, passage of liquid from the pump end into the wear end is prevented. When the rotatable shaft is stationary, the stationary ring and the rotatable ring contact each other to form a seal which prevents liquid flow from the pump end to the wear end.

The stationary section includes spring means for biasing the stationary ring against the rotatable ring both at times of rotation and at times of rest. A sealing means is provided for assuring that fluid product being pumped does not enter the internal volume of the stationary section and foul the working mechanism of the internal pump including the spring means.

Figure 1:
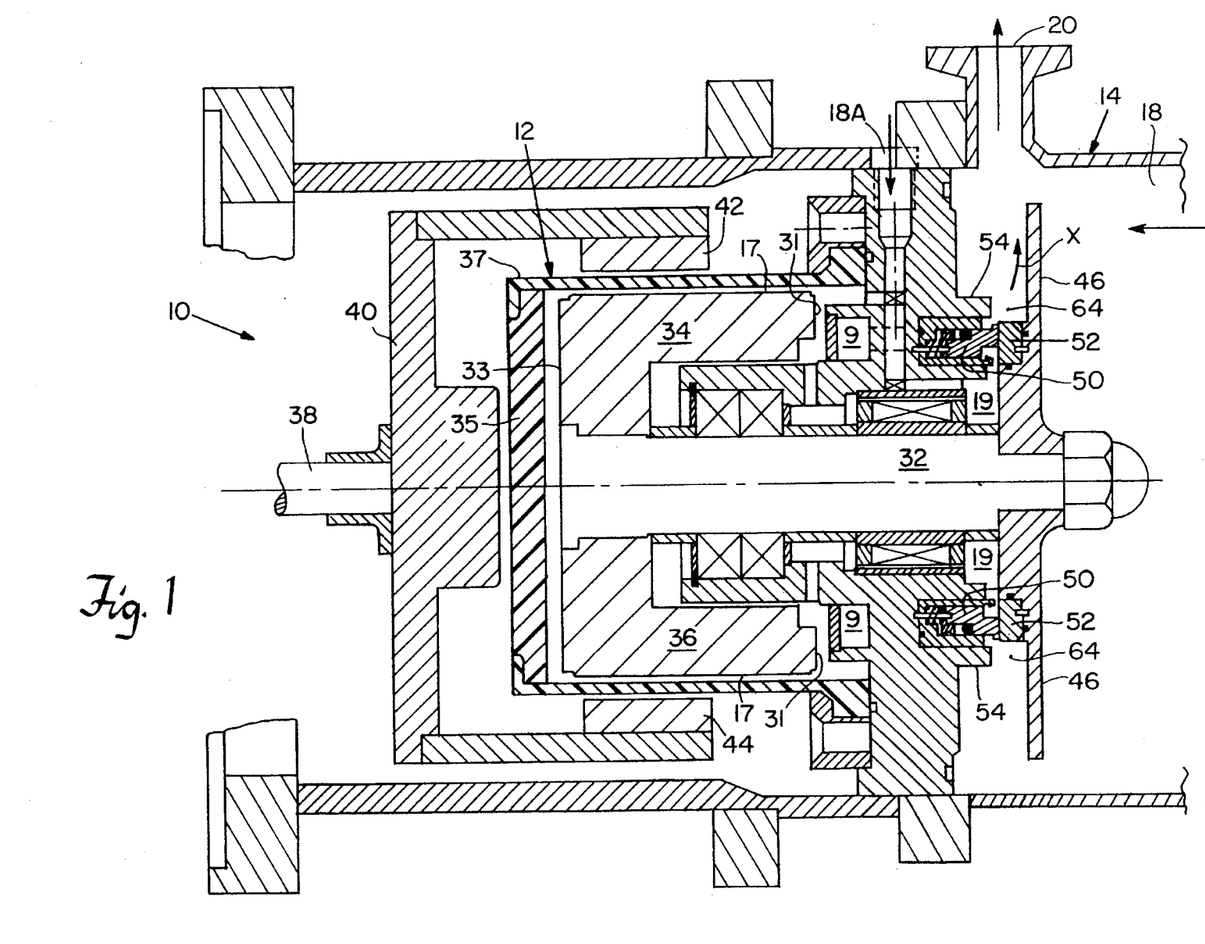
FIG. 1 is a side view in partial cross-section of an embodiment of this invention.
Figure 2:
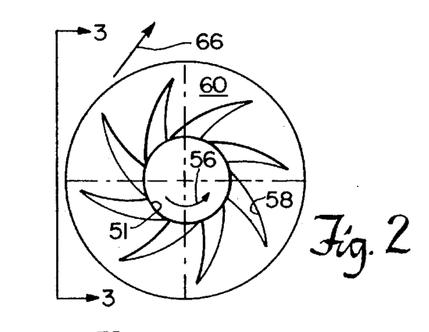
FIG. 2 is a front view of the internal pump shown in FIGS. 1 and 1A.
Figure 3:
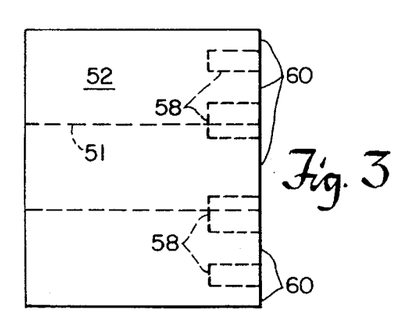
FIG. 3 is a side view of the internal pump of FIG. 2 taken along line 3—3.

Referring to FIGS. 1–3, pump 10 includes a stationary housing formed of a wear end housing section 12 and a pump end housing section 14 which are joined together by bolts. The pump 10 includes a liquid inlet 18 and a liquid outlet 20. The pump 10 comprises a rotatable shaft 32 to which is attached a plurality of magnets including magnets 34 and 36. The shaft 32 is positioned within stationary housing 35 includes an outer wall 37. The outer wall 37 seals the annular space 17 and magnets 34 and 36 from the rotating magnets 42 and 44. The stationary housing 35 includes an inlet 18A and an outlet X so that gas can be pumped through annular spaces 17 and 19 which gas is sealed from contact with the rotating magnets 42 and 44 by wall or can 37. When the rotatable housing 40 is rotated, the flux fields of magnets 42 and 44 interact with the flux fields of magnets 34 and 36 whether configured as permanent magnet drives or an eddy current drive and thereby cause rotatable shaft 32 to rotate. Rotatable shaft 32 rotates impeller 46 to effect pumping of the liquid within pump 10. Can 37 can be formed of a nonmetallic material so as to prevent eddy currents from being generated during use, thereby reducing power requirements and reducing generated heat. Cooling ducts 9 can be provided for passage of heat exchange liquid through stationary housing 35 to assist in cooling the pump 10 during use.

In order to cool the wear end, pressurized gas enters through inlet 18A and pressurizes all areas internal to housing section (can) 12 and housing 54. The gas provides and assists stationary ring 50 and rotatable ring 52 to separate from each other so as to pump gas into upstream zone X. This effects cooling and lubrication of the faces of rings 50–52 and prevents liquid being pumped from entering the wear end. The gas also cools bearings such as anti-friction bearings 13, 15 and 21. Gas pressurized externally from the pump 10 also can be employed. Details of the construction of the internal pump including the stationary ring 50 and the rotating ring 52 will be described below with reference to FIG. 15.

An internal pump is formed of a stationary ring 50 and a rotatable ring 52. Stationary ring 50 is positioned in section 54 of stationary housing section 12. Rotatable ring 52 is mounted on impeller 46 or is an integral part of the impeller 46 which is fixed to rotatable shaft 32 and is positioned in contact with fixed ring 50. Alternatively, rotatable ring 52 can be mounted on impeller 46. During rotation lubricating gas passes from zone 19 to zone 64. When the ring 52 is stationary, the rings 50 and 52 contact each other to form a seal. As shown in FIGS. 2 and 3, in one embodiment, rotatable ring 52 includes slots 58 in the direction of arrow 66. The slots 58 typically have a depth of about 0.0001 to 0.0003 inch which permits pumping of only small amounts of lubricating gas from zone 19 into zone 64 and then through outlet 20. It is to be understood that his invention can be utilized with any rotatable sealless pump.

Referring to FIGS. 1A, 2, 3, 4 and 4A, a canned pump 11 includes a stationary housing formed of a wear end housing section 12 and a pump end housing section 14 which are joined together by bolts. The pump 11 includes a fluid inlet 18 and a fluid outlet 20. The pump 11 comprises a rotatable shaft 32 to which is attached a rotor 31 positioned within windings 33. The stationary housing 37 seals annular spaces 17 as well as rotor 31 from the windings 33. The stationary housing 37 can be formed of a nonmetallic material. The stationary housing 37 includes an inlet 18A and an outlet 20A so that gas can be pumped through annular spaces 17 and 19. Repeller 23 is provided with vanes 25. Impeller 46 is provided with vent holes 27. Rotatable shaft rotates impeller 46 to effect pumping of the liquid within pump 11. Liquid 8 is prevented by gas 7 from entering housing 37.

Figure 1A:
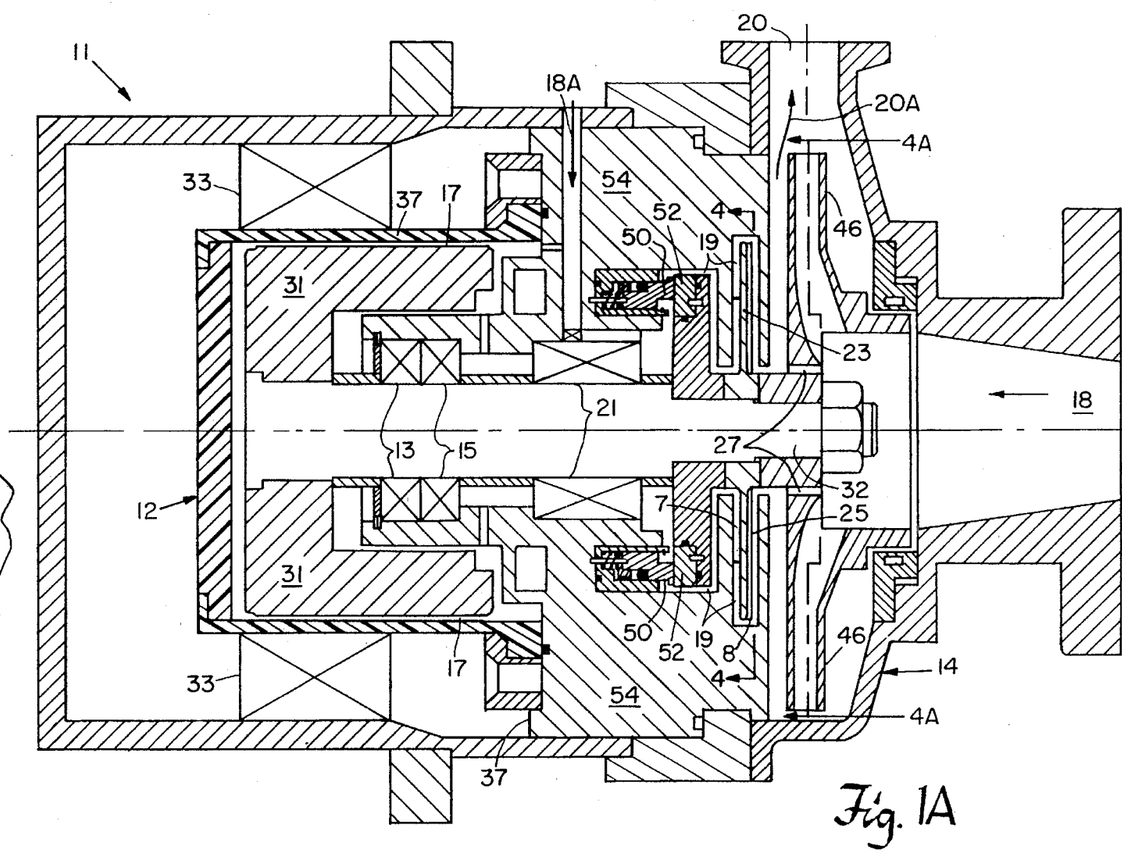
FIG. 1A is a side view in partial cross-section of an alternative embodiment of this invention.

An internal pump is formed of a stationary ring 50 and a rotatable ring 52. Stationary ring 50 is secured to section 54 of stationary housing section 12. Rotatable ring 52 is fixed to rotatable shaft 32 and is positioned in contact with fixed ring 50. As shown in FIGS. 2 and 3, rotatable ring 52 includes slots 58 and surfaces 66. The slots 58 typically have a depth of about 0.0001 to 0.0003 inch which permits pumping of only small amounts of lubricating gas from zone 19 into zone 64 and then through outlet 20.

Figure 5:
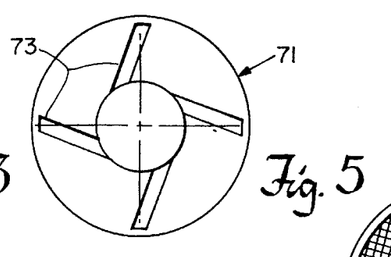
Figure 6:
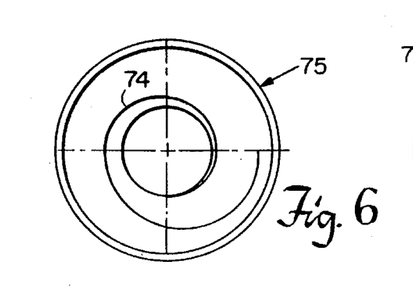
FIG. 6 is a front view of an alternative rotatable ring of an internal pump useful in this invention.
Figure 7:
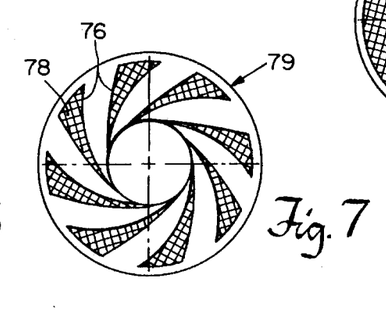
FIG. 7 is a front view of an alternative rotatable ring of an internal pump useful in this invention.
Figure 12:
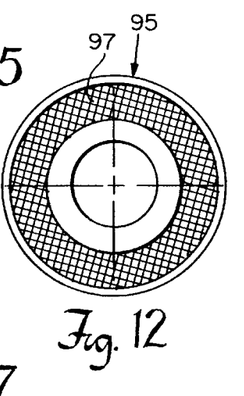
FIG. 12 is a front view of an alternative rotatable ring of an internal pump useful in this invention.
Figure 13:
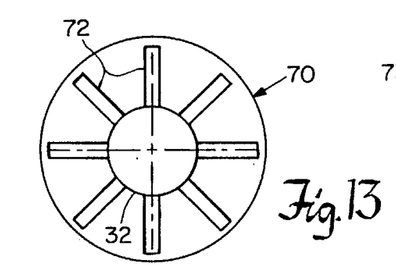
FIG. 13 is a front view of an alternative rotatable ring of an internal pump useful in this invention.

Referring to FIGS. 5–7, 12 and 13, alternative rotatable rings are shown which contact a stationary ring having a flat surface and function as described above with reference to FIGS. 2 and 3. As shown in FIG. 13, the rotatable ring 71 includes a plurality of angled slots 73. As shown in FIG. 6, a spiral shaped slot 74 is utilized on the rotatable ring 75. As shown in FIG. 12, the rotatable ring 95 includes a ring-shaped indentation 97. As shown in FIG. 13, a rotatable ring 70 is positioned on shaft 32. A plurality of slots 72 extend from the shaft 32.

Figure 4:
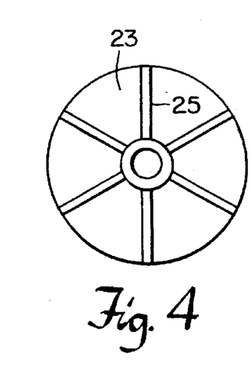
FIG. 4 is a front view of a repeller taken along line 4—4 of FIG. 1A.
Figure 4A:
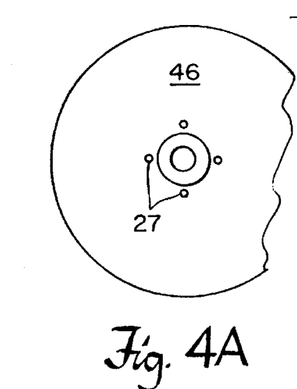
FIG. 4A is a front view of a impeller taken along line 4A—4A of FIG. 1A.
Figure 8:
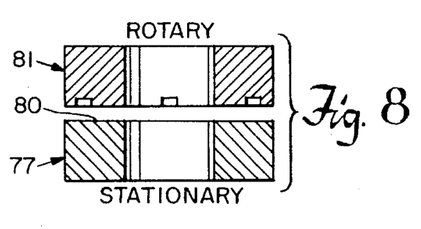
FIG. 8 is a front view of an alternative rotatable ring of an internal pump useful in this invention.
Figure 9:
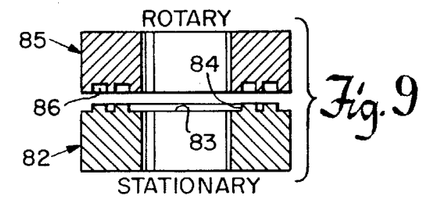
FIG. 9 is a front view of an alternative rotatable ring of an internal pump useful in this invention.
Figure 10:
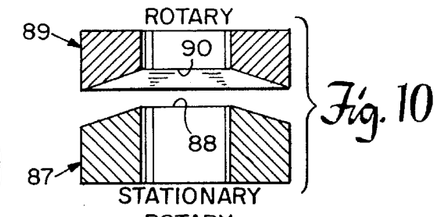
FIG. 10 is a front view of an alternative rotatable ring of an internal pump useful in this invention.
Figure 11:
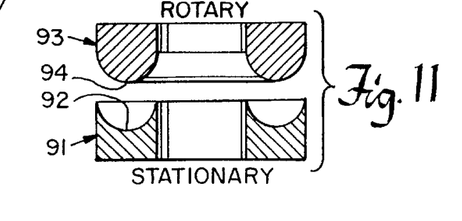
FIG. 11 is a front view of an alternative rotatable ring of an internal pump useful in this invention.

Referring to FIGS. 8–11, arrangements of a rotatable ring and a stationary ring are shown wherein the stationary ring has a non-flat surface. As shown in FIG. 8, the stationary ring 77 has a flat surface 80 and rotatable ring 81 has indentations such as are shown in FIGS. 2, 4 and 5. As shown in FIG. 9, stationary ring 82 has a surface 83 with a labyrinth 84 while rotatable ring 85 has a mating labyrinth 86. As shown in FIG. 10, stationary ring 87 has a raised central surface 88 while rotatable ring 89 has a mating indented surface 90. As shown in FIG. 11, stationary ring 9t has a surface with a circular indentation 92 while rotatable ring 93 has a mating surface 94. Other suitable arrangements of a rotatable ring and a stationary ring are disclosed in U.S. Pat. Nos. 4,290,611 and 5,090,712 which are incorporated herein by reference.

Figure 14:
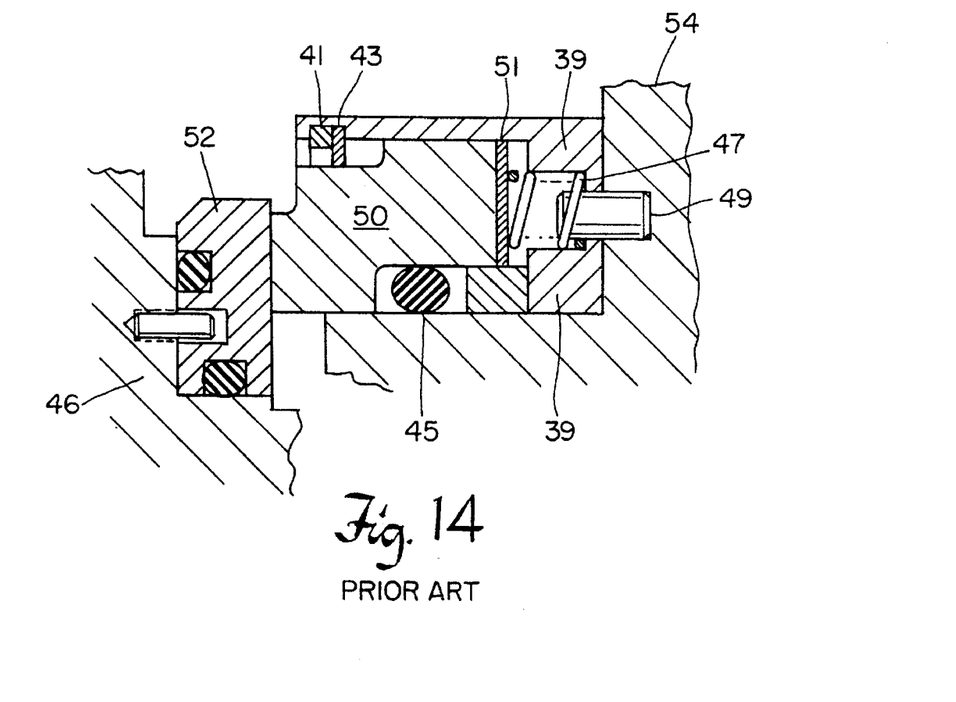
FIG. 14 is a cross-sectional view of a seal construction not useful in the apparatus of this invention.

Referring to FIG. 14, a seal structure has a relatively low useful life in a pump of this invention. The seal is positioned within a housing 54. The stationary ring 50 is positioned within stationary ring foundation 39. A snap ring 41 and circular plate 43 surrounds stationary ring 50. An O ring 45 seals the space between stationary ring 50 and housing 54. Stationary ring 50 is biased into position against rotating ring 52 by spring 47 positioned on pin 49 and against spring push plate 51. In this structure dirt by-passes snap ring 41 to contact and degrade spring 47.

Figure 15:
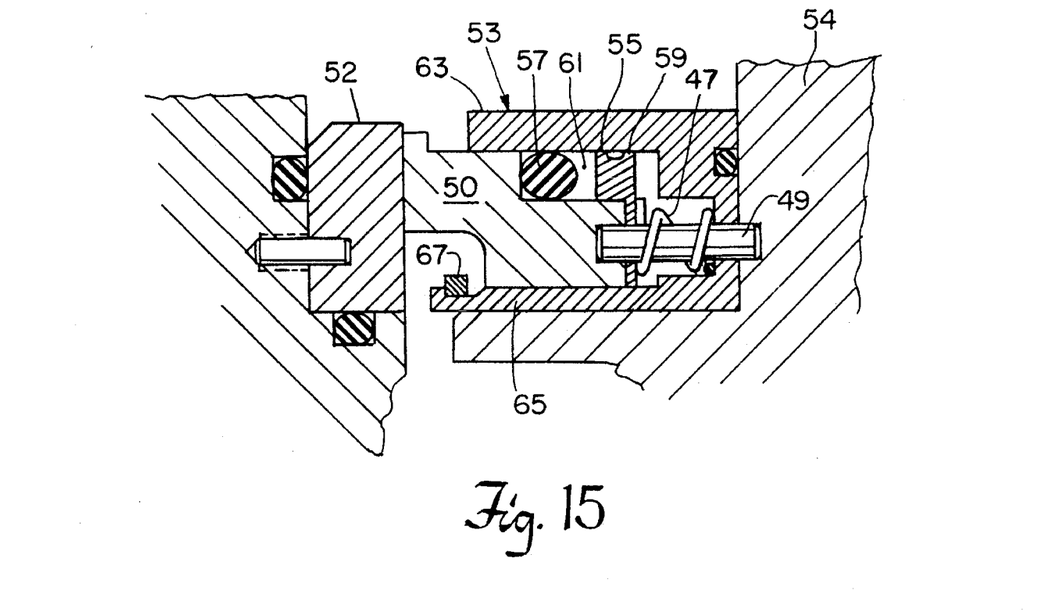
FIG. 15 is a cross-sectional view of a seal construction useful in the apparatus of this invention.

Referring to FIG. 15, the seal useful in the present invention is shown which prevents dirt or liquid infiltration into contact with spring 47. The seal includes a U-shaped housing 53 which houses spring 47 and pin 49 and push plate 55. An O-ring 57, spring 47 and pin 49 are positioned within space 61 between housing 53 which includes lips 63 and 65 positioned tightly about stationary ring 50. A snap ring 67 assists retaining stationary ring 50, O-ring 57 and spring 47 in housing 53. The combination of positioning lips 63 and 65, tightly O-ring 57 and extension 59 on push plate 55 exclude solids and liquid being pumped from contacting spring 47. Push plate 55 need not include extension 59 but rather can have a flat surface adjacent space 61. The seal useful in this invention exemplified by the seal of FIG. 15 extends the life of the pump at least about 100% when pumping corrosive liquids and at least about 500% when pumping liquids containing solids as compared with a pump having a seal exemplified by FIG. 14.

Figure 16:
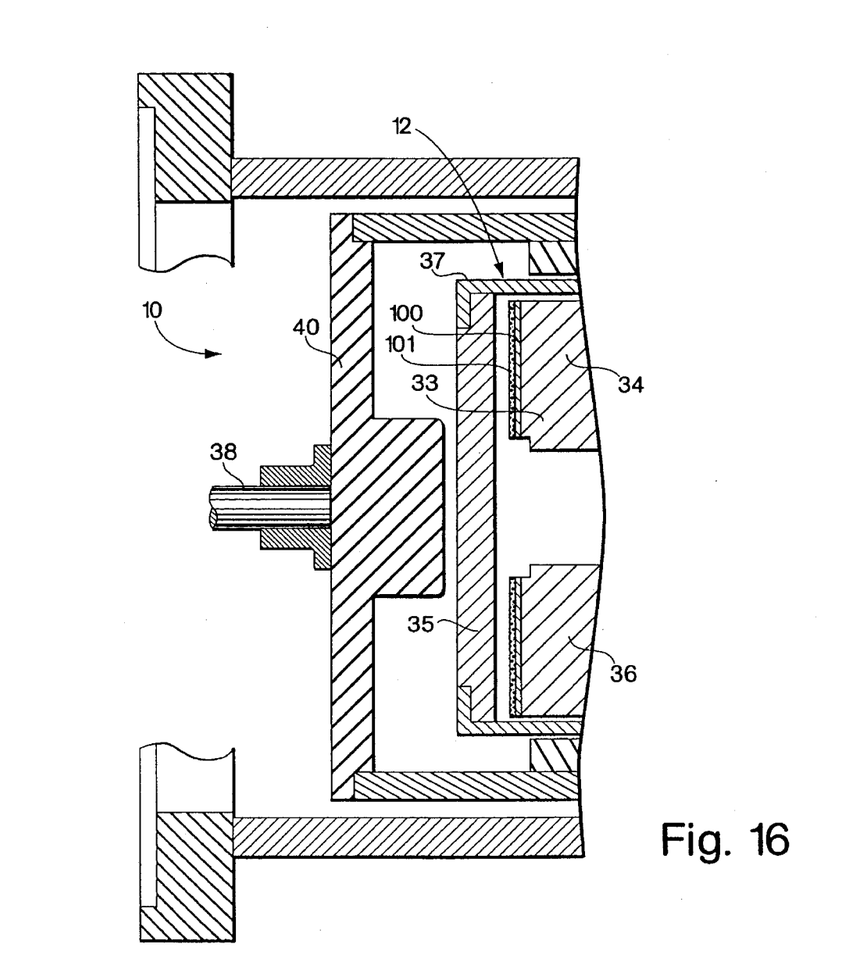
FIG. 16 is a partial cross-sectional view showing an impeller on the rotor of the embodiment of FIG. 1

Referring to FIG. 16, the pump 10 comprises a modification of the pump of FIG. 1 wherein an impeller 100 which includes vanes 101 for pumping gas within areas internal to can 12. Like reference numbers of FIGS. 1 and 16 refer to the same elements.

Figure 17:
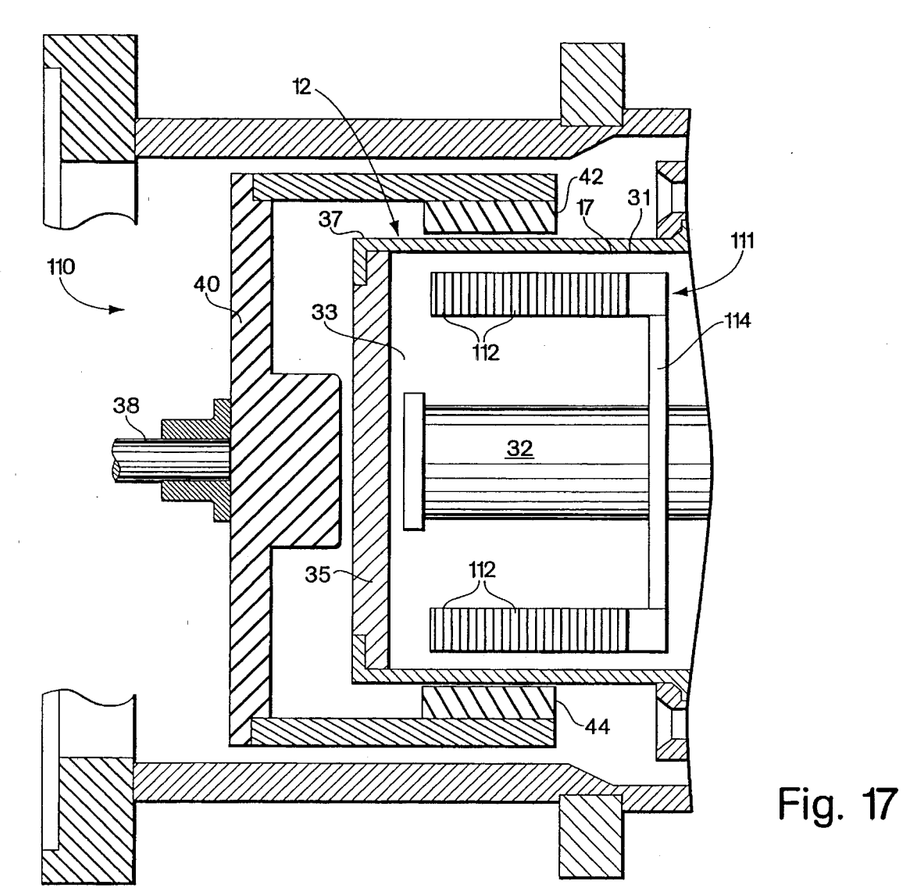
FIG. 17 is a cross sectional view of the apparatus of this invention including a torque ring.

Referring to FIG. 17, an alternative embodiment of this invention 110 is shown wherein a conventional torque ring 111 replaces the magnets 34 and 36 on the rotor shown in FIG. 1. Like reference numbers of FIGS. 1 and 17 refer to the same elements. The torque ring 111 is formed form ferrous based magnetizable washer-like elements 112 which are laminated together and which are mounted on bracket 114 secured to shaft 32. The rotating magnets 42 and 44 cause the torque ring to rotate and the shaft 32 to rotate.

The pumps of this invention provide substantial advantages over prior art sealless pumps comprising canned motor pumps or magnetic drive pumps. By the use of a barrier gas under conditions wherein the pumped fluid is excluded from the wear end of the pump, any pumped fluid regardless of chemical or physical characteristics can be pumped so long as degradation of the pump end is not effected. Thus, liquid detrimental to the wear-end, slurried or high temperature fluids can be processed without wear to the wear end. In addition, nonmetallic cans, i.e., seals between the stator and rotor sections at the wear end of the pump can be formed of nonmetallic compositions. Thus, losses due to eddy currents can be avoided thereby improving energy and cooling efficiencies substantially. In addition, the present invention permits the use of antifriction bearings.

We claim:

1. A pump comprising a rotatable shaft mounted in a wear end of said pump, said wear end including a rotor, means for effecting rotation of said rotor and said shaft and a housing seal between said means for effecting rotation and said rotor, a pump means mounted on said rotatable shaft in a pump end of said pump, means for introducing a liquid into said pump end, means for removing said liquid from said pump end, means for introducing pressurized gas into said wear end, an internal pump positioned between said pump end and said wear end on said rotatable shaft, said internal pump comprising a rotatable ring connected to said shaft and having a first face contacting a second face on a pump housing mounted stationary ring, said first face and second face having a surface configuration which effects transfer of said gas in said wear end to said pump end while preventing said liquid in said pump end from entering said wear end when said shaft is rotated and said internal pump sealing said wear end from said pump end when said shaft is not rotated, spring means for biasing said stationary ring in contact with said rotating ring and sealing means comprising a U-shaped housing positioned about said stationary ring, at least one O-ring positioned in a space between said U-shaped housing and said stationary ring on a radially outer surface of said stationary ring, said O-ring being positioned between said liquid being pumped in said pump end and said spring, and a push plate in contact with said spring, to bias said push plate to effect sealing between said space and said spring.

2. The pump of claim 1 wherein said first face includes an inclined surface.

3. The pump of claim 1 wherein said pump means comprises an impeller mounted on said rotatable shaft.

4. The pump of claim 1 wherein said means for effecting rotation of said rotor and said shaft comprises windings.

5. The pump of claim 1 wherein said rotor comprises rotatable magnet means.

6. The pump of claim 1 which includes an extension on said push plate which extends into said space.

7. The pump of claim 1 wherein said first face includes indentations.

8. The pump of claim 7 wherein said pump means comprises an impeller mounted on said rotatable shaft.

9. The pump of claim 1 wherein said means for effecting rotation of said rotor and said shaft comprises rotating magnet means.

10. The pump of claim 9 wherein said rotor comprises a rotatable torque ring.

11. The pump of any one of claims 1, 4, 5, 9 or 10 wherein said gas is air.

12. The pump of any one of claims 1, 4, 5, 9 or 10 which includes an impeller on said rotor.

13. The pump on any one of claims 1, 4, 5, 9 or 10 which includes means for passing a heat exchange fluid through a stationary housing of said pump.

14. The pump of any one of claims 1, 4, 5, 9 or 10 wherein said rotatable ring is connected directly on said shaft.

15. The pump of any one of claims 1, 4, 5, 9 or 10 wherein said rotatable ring is connected on rotatable mounting means, said mounting means being mounted on said shaft.

16. The pump of any one of claims 1, 4, 5, 9 or 10 wherein said gas is air.

17. The pump of any one of claims 1, 4, 5, 9 or 10 wherein said rotatable shaft in said wear end is mounted on antifriction bearing means.

18. The pump of any one of claims 1, 4, 5, 9 or 10 which includes a plurality of said O-rings positioned in a space between said U-shaped housing and said stationary ring.

19. The pump of claim 18 which includes an extension on said push plate which extends into said space.

* * * * *